United States Patent [19]

Suda et al.

[11] Patent Number: 4,774,539
[45] Date of Patent: Sep. 27, 1988

[54] CAMERA HAVING A FOCUS DETECTING APPARATUS

[75] Inventors: Yasuo Suda, Yokohama; Kazuhiko Arakawa, Kawasaki; Keiji Ohtaka, Tokyo; Takeshi Koyama, Tokyo; Ichiro Ohnuki, Tokyo, all of Japan

[73] Assignee: Canon Kabushiki Kaisha, Tokyo, Japan

[21] Appl. No.: 102,011

[22] Filed: Sep. 28, 1987

[30] Foreign Application Priority Data

Oct. 1, 1986 [JP] Japan ............... 61-231331
Oct. 1, 1986 [JP] Japan ............... 61-231332
Oct. 1, 1986 [JP] Japan ............... 61-231333

[51] Int. Cl.⁴ ............................................. G03B 3/00
[52] U.S. Cl. .............................. 354/406; 354/480; 354/481; 354/482
[58] Field of Search ............. 354/400, 402, 403, 406, 354/407, 408, 480, 481, 482

[56] References Cited

U.S. PATENT DOCUMENTS

| | | | |
|---|---|---|---|
| 4,047,187 | 9/1977 | Mashimo et al. | 354/23 |
| 4,410,258 | 10/1983 | Aoki et al. | 354/25 |
| 4,429,966 | 2/1984 | Hosoe et al. | 354/406 |
| 4,483,604 | 11/1984 | Hiramatsu | 354/481 |
| 4,488,799 | 12/1984 | Suzuki et al. | 354/406 |
| 4,526,458 | 7/1985 | Kawamura et al. | 354/406 |
| 4,529,287 | 7/1985 | Karasaki et al. | 354/406 |
| 4,552,445 | 11/1985 | Mukai et al. | 354/406 |
| 4,561,750 | 12/1985 | Matsumura | 354/406 |
| 4,563,068 | 1/1986 | Kimura et al. | 354/480 |
| 4,573,784 | 3/1986 | Suzuki | 354/408 |
| 4,636,624 | 1/1987 | Ishida et al. | 354/406 |
| 4,699,493 | 10/1987 | Koyama et al. | 354/406 |
| 4,712,901 | 12/1987 | Ohtaka | 354/408 |
| 4,728,785 | 3/1988 | Ohnuki et al. | 354/408 |

FOREIGN PATENT DOCUMENTS 0074840 3/1973 Japan .

Primary Examiner—Russell E. Adams
Attorney, Agent, or Firm—Fitzpatrick, Cella, Harper & Scinto

[57] ABSTRACT

In a camera provided with a focus detecting apparatus in which the object light passed through a photo-taking lens is limited in its passage area by a field mask, the secondary image of an object to be photographed is obtained by a secondary imaging optical system and the secondary image is received by a line sensor and the imaging condition of the photo-taking lens is detected on the basis of the photoelectrically converted output of the line sensor, the opening area of the field mask is set so that the secondary image of the object to be photographed is directed to the both sides of the line sensor, and spot photometering sensors are disposed on the both sides of the line sensor and in the area to which the secondary image is applied, so that the photometering center of gravity is positioned substantially on the line sensor.

16 Claims, 11 Drawing Sheets

CAMERA HAVING A FOCUS DETECTING APPARATUS

BACKGROUND OF THE INVENTION

1. Field of the Invention

This invention relates to a camera having a focus detecting apparatus.

2. Related Background Art

Cameras provided with the focus detecting function have heretofore generally been of a construction in which a focus detecting optical system is disposed on the optic axis of a photo-taking lens or at a location somewhat deviated therefrom, but where an attempt has been made to add the spot photometering function to the camera, the following problem has been encountered. That is, it is necessary that the spot photometering optical system be also disposed substantially at the same location as the focus detecting optical system, namely, near the optic axis of the photo-taking lens, and therefore a contrivance such as dividing the optical path thereof by a half-mirror or the like has been required with a result that the construction becomes complicated and is disadvantageous in terms of the quantity of light.

There are also available cameras in which a spot photometering sensor or the like is disposed near the finder, but such cameras are of the type in which a light beam having passed the central split prism position of a focusing screen is photometered and therefore, it has been impossible to accomplish accurate photometry. It is also necessary to divide the optical path thereof by a half-mirror or the like in a manner similar to that described previously and therefore, such cameras have been disadvantageous in terms of both construction and quantity of light. Further, there has also been proposed a camera in which a sensor for focus detection is used also as a sensor for spot photometry (for example, Japanese Laid-Open Utility Model Application No. 96526/1983), but this camera has suffered from a problem that the photometering area is very small and much time is required for photographing because photometry and distance measurement must be done time-serially.

Also, in a single lens reflex camera, the provision of both the focus detecting function and the TTL flashlight controlling function involves considerable difficulties in layout because generally both of the optical systems therefor are disposed in the lower portion of a mirror box. That is, from the necessity of distance-measuring the center of the picture plane in the focus detecting optical system and from the necessity of equalizing the photometric sensitivity distribution at the left and right in the TTL flashlight controlling optical system, it is ideal to dispose the centers of the optical paths thereof on the center of the photo-taking optic axis, but for this purpose, a contrivance such as dividing the optical path by a beam splitter or the like is necessary, and this leads to the difficulty in making the camera compact as well as the disadvantage in terms of quantity of light and thus, it has been unavoidable either to sacrifice the performances of the respective devices from those limitations or to shift the TTL flashlight controlling optical system from the center of the photo-taking optic axis and sacrifice the photometric sensitivity distribution.

SUMMARY OF THE INVENTION

It is an object to provide an optical system for effecting focus detection and photometry (including flashlight control) without using a complicated construction.

Further specific objects of the present invention will become apparent from the following detailed description of the invention taken in conjunction with the accompanying drawings.

DESCRIPTION OF THE PREFERRED EMBODIMENTS

Figures 1, 2:
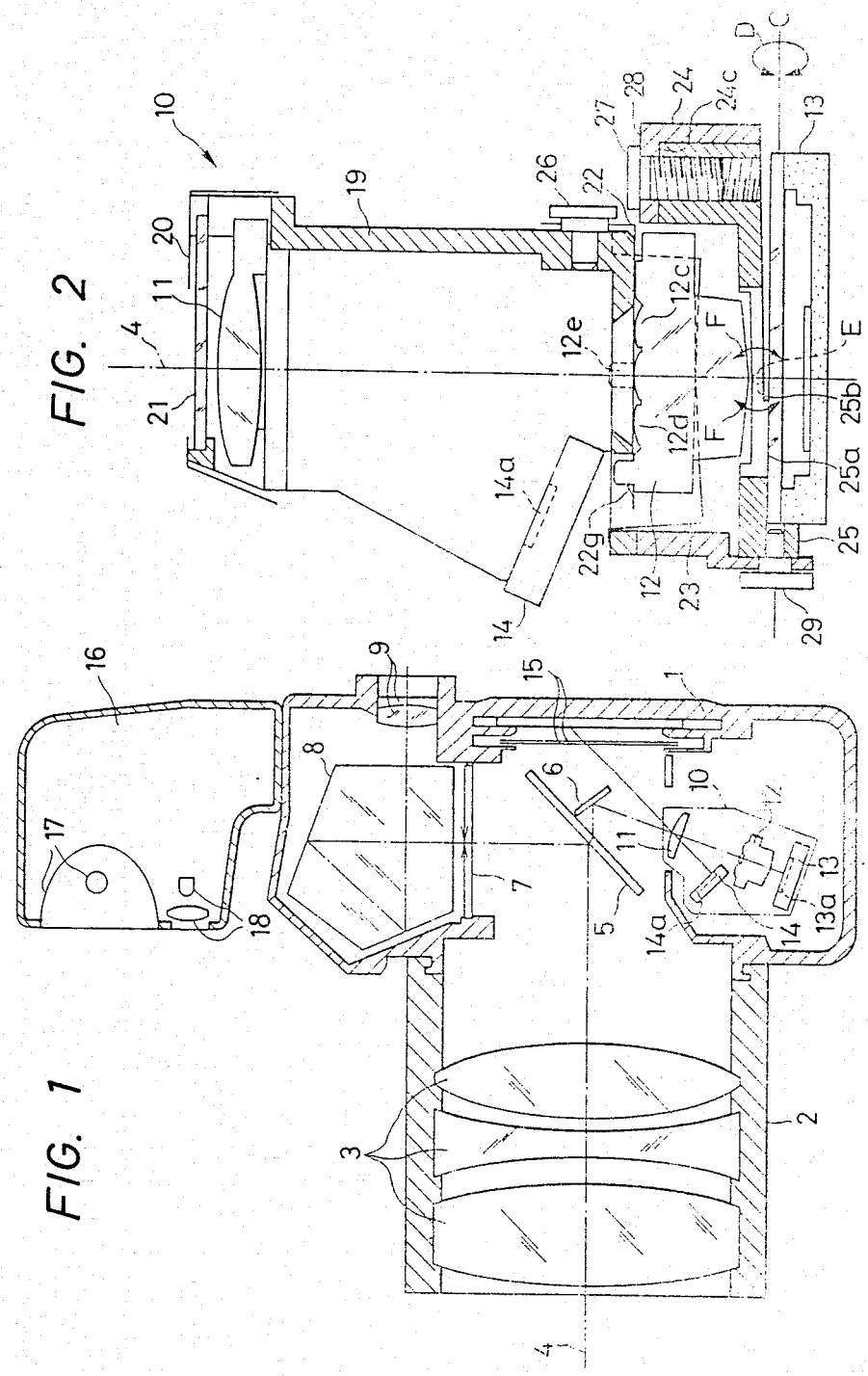
FIG. 1 is a cross-sectional view showing an embodiment of the present invention.
FIG. 2 is a cross-sectional view of the AF photometric unit shown in FIG. 1.

The present invention will hereinafter be described in detail with respect to an embodiment thereof shown in the drawings.

Figure 3:
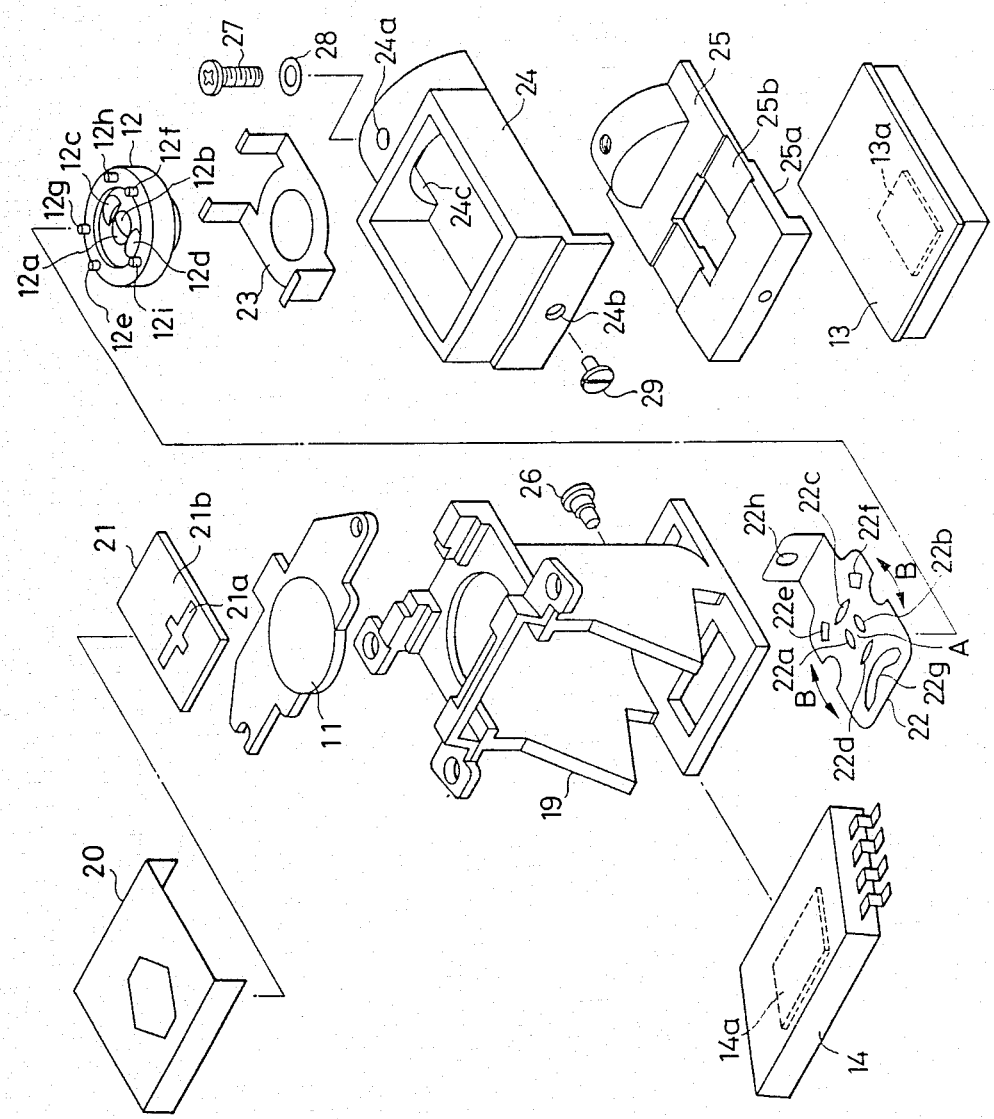
FIG. 3 is a developed perspective view illustrating the structure of the AF photometric unit.

FIGS. 1 to 3 show an embodiment of the present invention, FIG. 1 being a cross-sectional view showing a state in which a flashlight device has been mounted. In FIG. 1, reference numeral 1 designates a camera body, reference numeral 2 denotes a lens barrel for holding a photo-taking lens 3 for movement in the direction of the optic axis 4, reference numeral 5 designates a main mirror cooperating with a sub-mirror 6 to separate the object light passed through the photo-taking lens 3 into a finder system and an AF photometric system at a mirror-down position, reference numeral 7 denotes a focusing screen constituting the finder system together with a pentaprism 8 and an eyepiece 9, reference numeral 10 designates an AF photometric unit forming an AF photometric system (herein a TTL flashlight control system and an AE system are referred to as the photometric system) having a sensor 13 for AF and AE having a sensor portion 13a, etc. in which are disposed a field lens 11, a secondary imaging lens 12, a line sensor for AF and a line sensor for AE (the details of which will be described later) and having a TTL flashlight control sensor 14 having a sensor portion 14a, etc., reference numeral 15 denotes a shutter, reference numeral 16 designates a flash device, reference numeral 17 denotes a flashlight emitting portion, and reference numeral 18 designates an infrared ray auxiliary light emitting portion for AF.

FIGS. 2 and 3 are detailed views of only the essential portions of the AF photometric unit 10 shown in FIG. 1, FIG. 2 being a cross-sectional view thereof, and FIG. 3 being a developed perspective view thereof.

On the upper surface side of a body block 19, a field mask 20, an infrared cut filter 21 having areas 21a and 21b differing in transmission factor, and the field lens 11 are mounted in the named order, and on the lower surface side of the body block 19, a stop 22, the secondary imaging lens 12, a keep spring 23, a sensor block 24, a sensor holder 25 and the sensor 13 for AF and AE are mounted in the named order. Further, on the body block 19, the TTL flashlight control sensor 14 is mounted at a position capable of receiving the reflected light from a film surface through the field lens 11.

The stop 22 has pairs of openings 22a, 22b and 22c, 22d provided orthogonally to each other as shown in FIG. 3 and also has positioning portions 22e and 22f having an arc whose radius is a point coincident with the center A of these openings, a spring portion 22g and a slot 22h. The secondary imaging lens 12 having lens portions 12a–12d is positioned by pins 12e and 12f with the stop 22 nipped between it and the body block 19, and is fixed by the keep spring 23 (see FIG. 2). In such a state, the lens portions 12a–12d of the secondary imaging lens 12 are in a positional relation (the details of which will be described later) corresponding to the openings 22a–22d, and the pins 12g and 12h of the secondary imaging lens 12 are inserted in the positioning portions 22e and 22f, respectively, and a pin 12i of the secondary imaging lens 12 is inserted in the spring portion 22g. By the pin 12i being inserted in the spring portion 22g, the spring portion 22g is deformed to produce a force which biases the stop 22 toward the positioning portions 22e and 22f. Accordingly, an eccentric pin 26 is inserted into a hole in the body block 19 through the slot 22h of the stop 22 and is rotated, whereby minute angular rotation (in the direction of arrow B in FIG. 3) of the stop 22 about the center A of the openings of the stop 22 becomes possible.

The sensor block 24 and the sensor holder 25 are disposed below the secondary imaging lens 12 as previously described, and these together with a mounting screw 27, a washer 28 and an eccentric pin 29 constitute a mechanism for regulating the inclination of the sensor 13 for AF and AE disposed therebelow. The sensor 13 for AF and AE is adhesively secured to the mounting surface 25a of an sensor holder 25, and this sensor holder 25 is fixed to the arcuate mounting surface 24c of the sensor block 24 having mounting holes 24a and 24b by the mounting screw 27 and the washer 28 through said mounting hole 24a.

The center R of the arcuate mounting surface 24c is an axis C supposedly depicted in FIG. 2 and the mounting hole 24a of the sensor block 24 is a slot and therefore, regulation of inclination in the direction of arrow D in FIG. 2 is possible. Further, the sensor holder 25 is fixed to the sensor block 24 also by the eccentric pin 29 through the mounting hole 24b which is a slot like the mounting hole 24a, and the thickness of a bent portion 25b of the sensor holder 25 is made sufficiently small to provide flexibility and therefore, by rotating the eccentric pin 29, regulation of inclination in the direction of arrow F in FIG. 2 substantially about an axis E supposedly depicted in FIG. 2 is possible.

The TTL flashlight control system, the AF system and the AE system in the AF photometric unit 10 of the above-described construction will hereinafter be described.

The TTL flashlight control system (hereinafter referred to as the flashlight control system) will first be described. The flashlight control system is for introducing the reflected light from the film surface during flashlight photography into the sensor portion 14a of the flashlight control sensor 14 by the field lens 11 and stopping the light emission of the flash device 16 by the quantity of received light thereof. That is, when the main mirror 5 and the sub-mirror 6 are moved up and the forward curtain of the shutter 15 is moved and the flash device 16 emits a light with the film being exposed, the object image is formed on the film and the reflected light thereof is produced. Some of the reflected light passes through the field mask 20, the infrared cut filter 21 and the field lens 11 of the AF photometric unit 10, shown in FIG. 2, to the sensor portion 14a of the flashlight control sensor 14, and, when it is detected by a microcomputer to be described that, for example, the quantity of received light has reached a predetermined photometric amount, a light emission stopping signal is output to the flash device 16 to stop the light emission thereof.

As can be seen from what has been previously described, the field lens 11 used in the AF system and the AE system are also used in the TTL flashlight control system and therefore, the photometric sensitivity distribution can be made good with the compactness and low cost of the camera realized.

Figure 4:
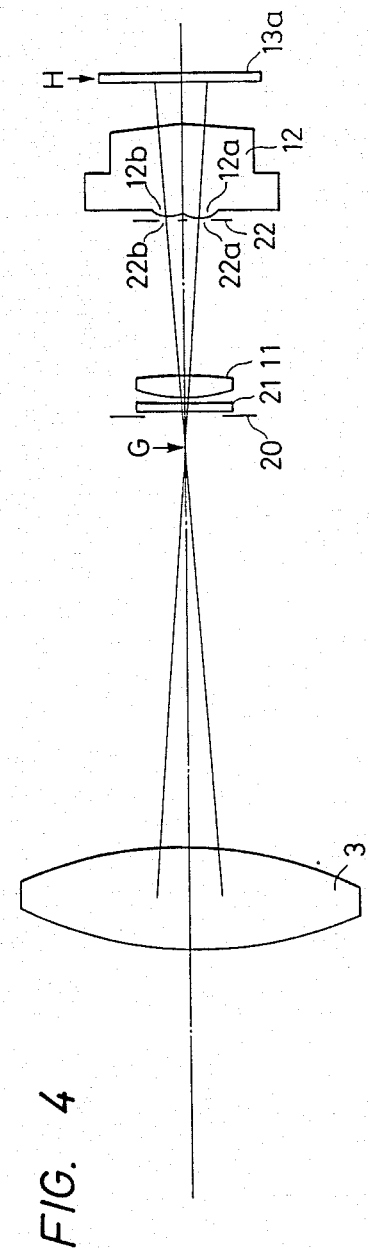
FIG. 4 is a developed view of one optical path of the AF system in the AF photometric unit.
Figure 5:
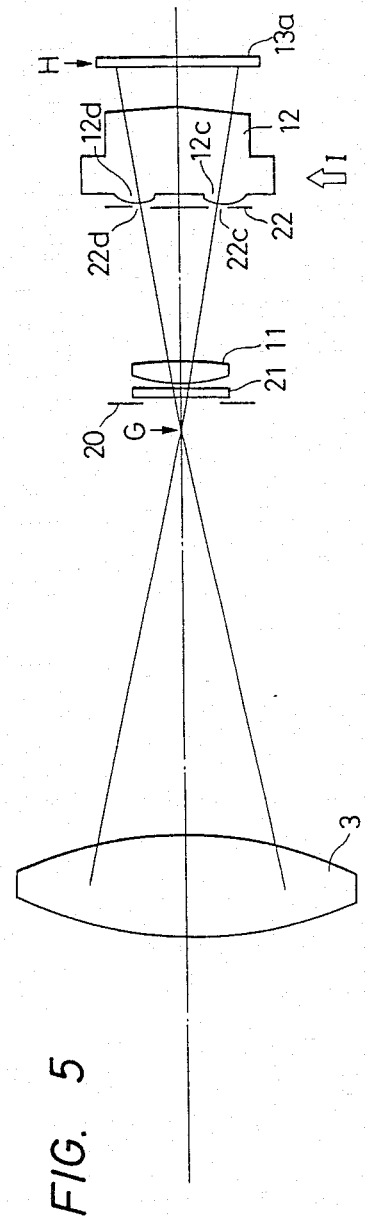
FIG. 5 is a developed view of the other optical path.
Figure 6:
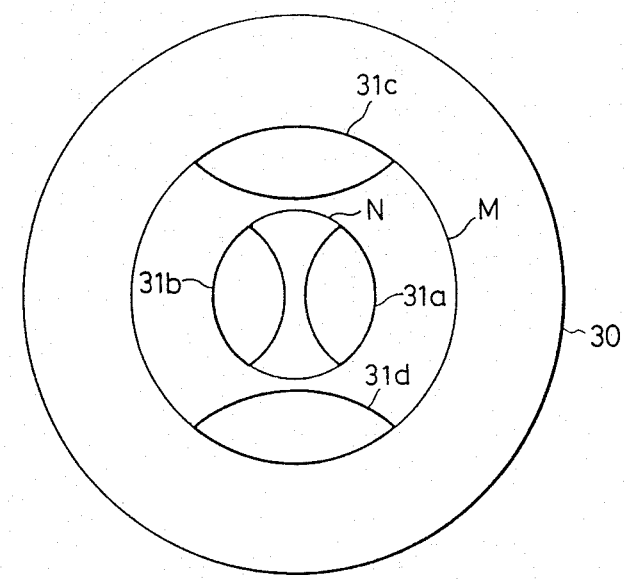
FIG. 6 illustrates the pupil area division.

The AF system will now be described. FIGS. 4 and 5 are developed views of the optical paths of the AF system. The secondary imaging lens 12, as shown in FIG. 3, has pairs of lens portions 12a, 12b and 12c, 12d disposed orthogonally to each other, and FIG. 4 shows a cross-section including the optic axes of the lens portions 12a and 12b, and FIG. 5 shows a cross-section including the optic axes of the lens portions 12c and 12d. In these figures, for simplicity of illustration, only a light ray which passes through the center of each opening of the stop 22 and whose object height in the primary imaging surface is 0 is depicted, the position indicated by arrow G is the primary imaging surface, and arrow H indicates the sensor surface of the sensor 13 for AF and AE. The openings 22a–22d of the stop 22 correspond to the lens portions 12a–12d, respectively, of the secondary imaging lens 12, as previously described, whereby four secondary images are formed on the sensor portion 13a, and the boundaries between these secondary images are separated by the image of the opening of the field mask 20. The spacing between the openings 22a and 22b of the stop 22 which form a pair similar in shape is narrower than the spacing between the openings 22c and 22d, and these openings are projected onto the pupil of the photo-taking lens 3 by the field lens 11. This state is shown in FIG. 6. In FIG. 6, reference numeral 30 designates the exit pupil of the phototaking lens 3, and 31a–31d denote the areas on the pupil plane which correspond to the openings 22a–22d, respectively, of the stop 22. In the case of a photo-taking lens for a popular camera, the areas M and N may be chosen to the order of F4 and F8, respectively.

Figure 7:
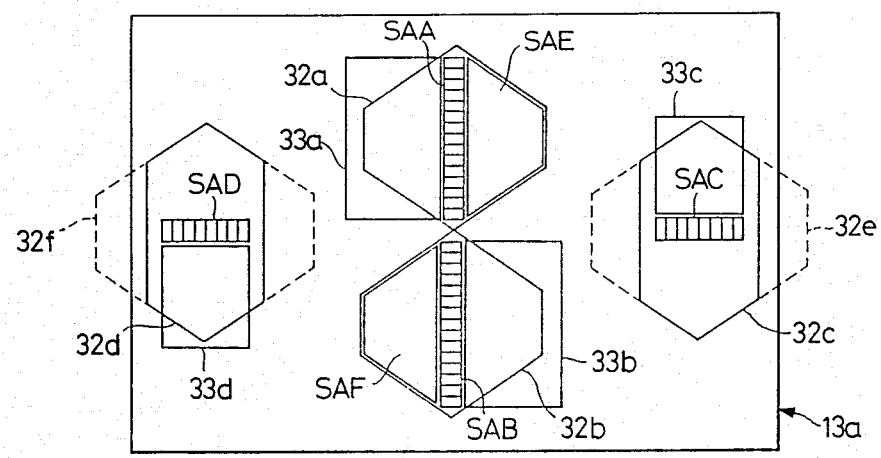
FIG. 7 illustrates the relation between the sensors for AF and AE shown in FIG. 1 and a secondary image.

FIG. 7 shows the state of the secondary image on the sensor portion 13a of the sensor 13 for AF and AE. Line sensors SAA, SAB and SAC, SAD for AF for effecting longitudinal distance measurement and lateral distance measurement and two sensors SAE, SAF for AF adjacent to the line sensors SAA, SAB (with the distance measuring area interposed therebetween) are disposed on the sensor portion 13a, and secondary images 32a–32d are projected thereon by the secondary imaging lens 12. The secondary images 32a and 32b are the object images on the pupil of the photo-taking lens 3 by light beams passed through the areas 31a and 31b, and the secondary images 32c and 32d are the object images by light beams passed through the areas 31c and 31d. The portions indicated by broken lines 32e and 32f are image areas eclipsed by the sub-mirror 6. Reference characters 33a–33d shown on the sensor portion 13a designate sensor driving circuits for the line sensors SAA–SAB, and a light-intercepting aluminum layer is formed thereon so that the incidence of light onto these portions may not affect the sensor outputs.

Figure 8:
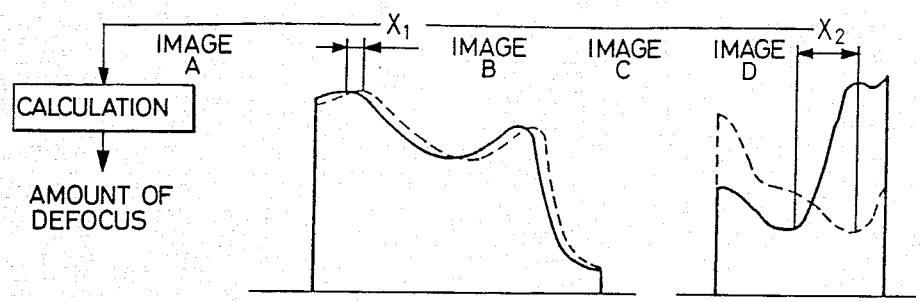
FIG. 8. illustrates image signals used during calculation of the amount of defocus.

FIG. 8 illustrates the calculation of the amount of defocus. In this figure, the outputs of the line sensors SAA–SAD are represented as images A–D, respectively. As described in connection with FIG. 6, the images A and B are formed by light beams passed through the areas 31a and 31b on the pupil, while the images C and D are formed by light beams passed through more outer areas 31c and 31d and therefore, the amount of image deviation relative to the defocus of the photo-taking lens 3 is greater for the images C and D than for the images A and B. That is, in FIG. 8, the phase difference $X_2$ is greater than the phase difference $X_1$. The information of these phase differences $X_1$ and $X_2$ is transmitted through the sensor driving circuits 33a–33d to a microcomputer, to be described, where calculation of the amount of defocus is effected and focus control of the phototaking lens 3 is executed. Where distance measurement is effected by both of the line sensors SAA, SAB and SAC, SAD, the result of calculation from the images C and D is greater in the amount of image deviation and therefore, the use of this result will lead to higher focus detection accuracy.

Figure 9:
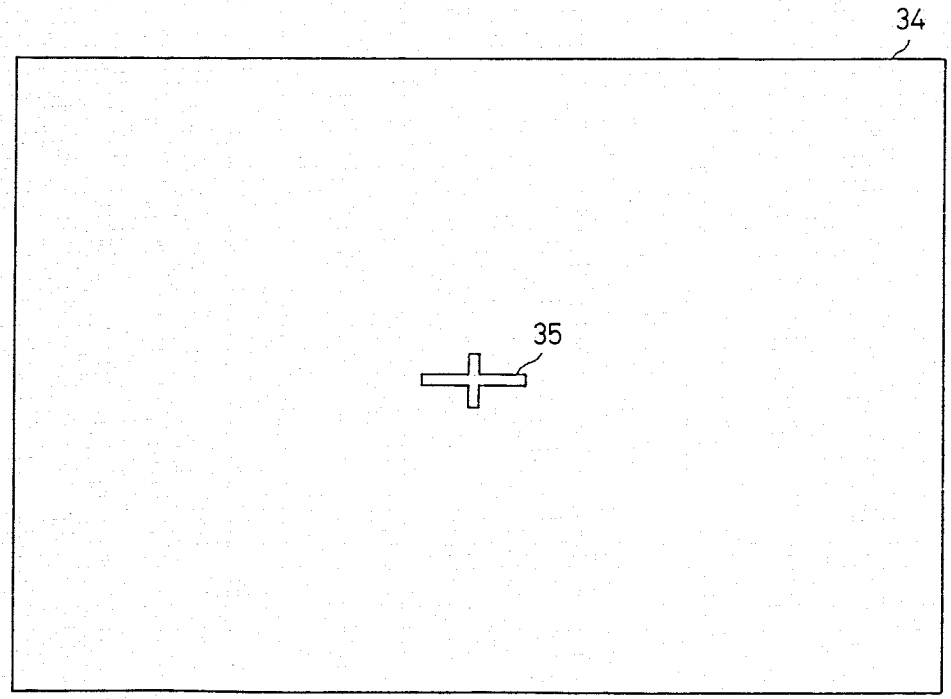
FIG. 9 shows the distance measuring area in the finder view field.

FIG. 9 shows the distance measuring area in the finder view field of the camera. In FIG. 9, reference numeral 34 designates the finder view field of the camera, and reference numeral 35 denotes the distance measuring area supposedly depicted in the finder view field 34. The lateral (horizontal) distance measuring area is coincident with the reversely projected images of the line sensors SAA and SAB, and the longitudinal (vertical) distance measuring area is coincident with the reversely projected images of the line sensors SAC and SAD.

Figure 10:
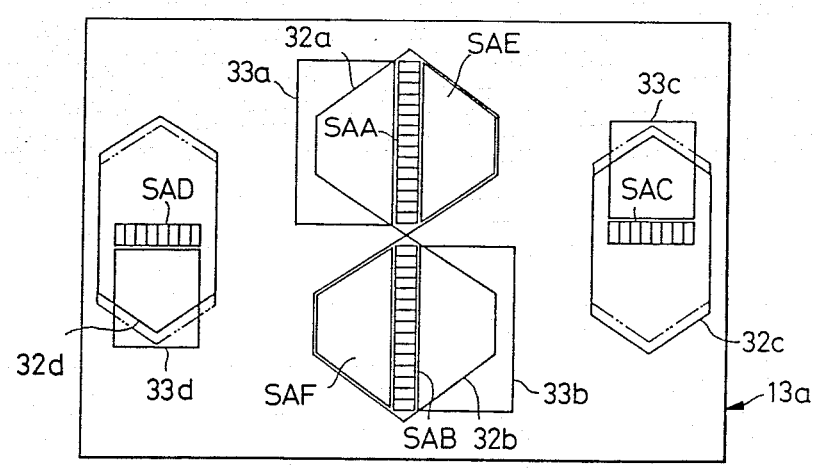
FIG. 10 illustrates the relation between the sensors for AF and AE and the secondary image when there is a manufacturing error in the secondary imaging lens shown in FIG. 1.
Figure 11A:
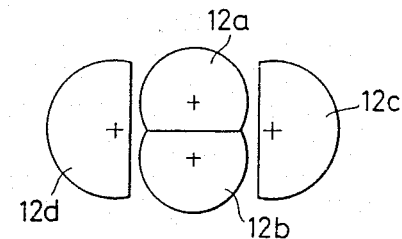
FIG. 11A is a plan view showing an ideal secondary imaging lens free of a manufacturing error.
Figure 11B:
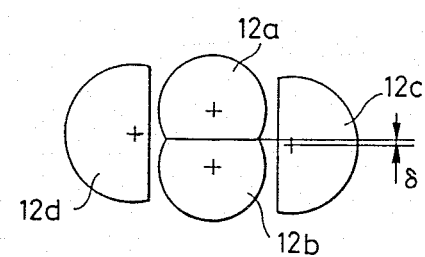
FIG. 11B is a plan view showing a secondary imaging lens having a manufacturing error.
Figure 12:
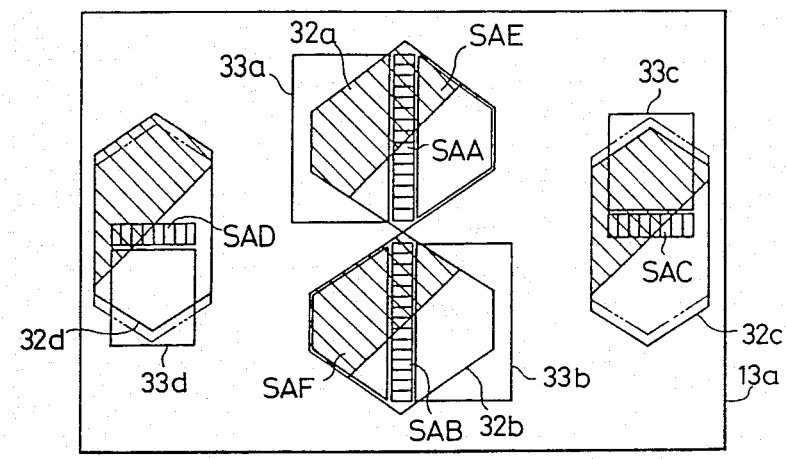
FIG. 12 illustrates the object image when the secondary imaging lens of FIG. 11B is used.

FIG. 10 shows the state on the sensor portion 13a of the sensor 13 for AF and AE when a manufacturing error is caused in the secondary imaging lens 12. That is, this is supposed to be a case where the ideal positional relation between the lens portions in the secondary imaging lens 12, as shown in FIG. 11(a), causes an error (for the openings 22a–22d of the stop 22) as shown in FIG. 11(b). When there is thus no degree of rectangularity of the lens portions 12a, 12b and 12c, 12d, the degree of rectangularity of the secondary images 32a, 32b and 32c, 32d also becomes bad, as shown in FIG. 10. Accordingly, if the positions of the line sensors SAA and SAB are adjusted to the secondary images 32a and 32b, the alignment of the line sensors SAC and SAD with the secondary images 32c and 32d will become impossible. Thus, different portions of the object to be photographed are projected onto the line sensors SAC and SAD, and a focusing error is caused when the object image of a brightness pattern having oblique lines, as shown in FIG. 12, is incident on the distance measuring area, and this is inconvenient. So, in such a case, the stop 22 is rotated in the direction of arrow B in FIG. 3 and the alignment of the secondary images 32c and 32d with the line sensors SAC and SAD is effected.

Figure 13:
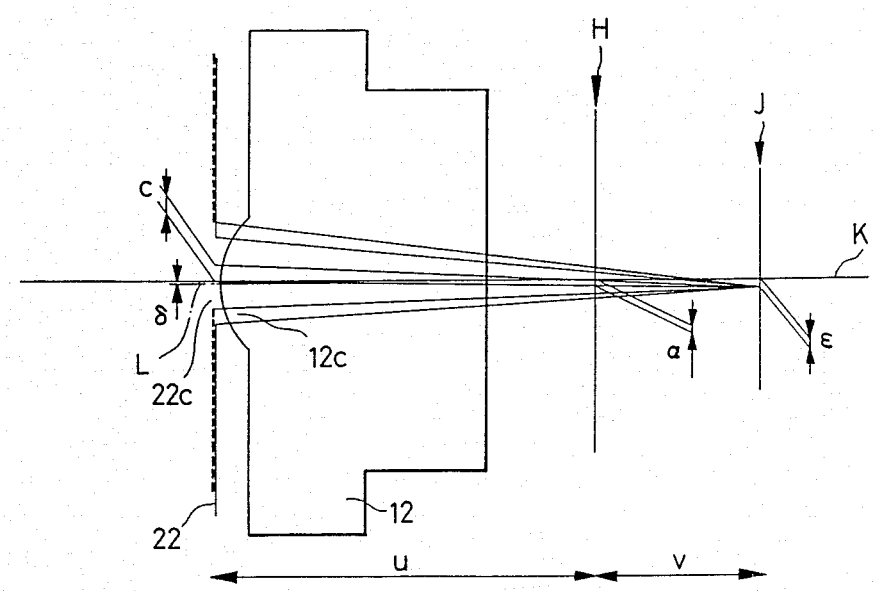
FIG. 13 illustrates the amount of position adjustment of the secondary image and the line sensor when the secondary imaging lens of FIG. 11B is used.

FIG. 13 is a view for helping the previous description (alignment), and is a view of the secondary imaging lens 12 as seen from the direction of arrow I in FIG. 5. In FIG. 13, letter J designates the secondary imaging surface of the lens portions 12c and 12d, and thus, the imaging plane of the lens portions 12c and 12d lies rearwardly of the sensor plane H of the sensor 13 for AF and AE, and a defocused image is projected onto the sensor plane H. On the other hand, the imaging plane of the lens portions 12a and 12b coincides with the sensor plane H, and an image in focus is projected onto the line sensors SAA and SAB. In other words, so as to be able to correct the manufacturing error of the secondary imaging lens 12, the design is made such that the imaging surface of the lens portions 12a and 12b is coincident with the sensor plane H and the imaging plane of the lens portions 12c and 12d lies rearwardly (or forwardly) of the sensor plane H, that is, a defocused imaqe is projected onto the sensor plane H. In this figure, K is an axis determined by the lens portions 12a and 12b, L is the axis of the lens portion 12c, u is the distance from th position of the stop 22 to the sensor plane H, and v is the distance from the sensor plane H to the secondary imaging plane J.

Assuming that deviation ε of the image position on the secondary imaging plane J is caused when the axis L of the lens portion 12c is eccentric by δ, the following relation is established with β as the secondary imaging magnification:

$$\epsilon = \delta(1+\beta) \qquad (1)$$

At this time, the deviation of the image position on the sensor plane H is $a(=\epsilon \cdot u/(u+v))$. This deviation can be varied by changing the positions of the openings 22c and 22d of the stop 22 because the image is defocused. Consequently, if the image positionally deviated by ε on the secondary imaging plane J is adjusted so as to intersect the axis K on the sensor plane H, there will be no focusing error even if the object image is incident with the oblique lines shown in FIG. 12, and for this purpose, the opening 22c of the stop 22 may be moved by c, and this amount of movement c can be found from the following equation. That is, representing the amount of movement c by the distances u and v, the amount of eccentricity δ and the secondary imaging magnification β, $$\epsilon/v = c/u$$

$$c = u\epsilon/v. \quad (2)$$

From the above-mentioned equations (1) and (2), $$c = u\delta(1+\beta)/v. \quad (3)$$

Movement of the stop 22 (the openings 22c and 22d) by the amount of movement c obtained from the aforementioned equation is possible by rotating the eccentric pin 26 shown in FIG. 3. At this time, the other secondary images 32a and 32b are not affected by the rotation of the stop 22 because an image in focus is formed on the sensor surface H. Even if the position of the sensor 13 for AF and AE in the direction of the optic axis is deviated by the manufacturing error, the movement of the openings 22a and 22b of the stop 22 resulting from the rotation of the stop 22 is relatively small and the resultant deviation of the image position is minute because the openings 22a and 22b of the stop 22 forming the secondary images 32a and 32b are positioned inside (relative to the openings 22c and 22d).

Figure 14:
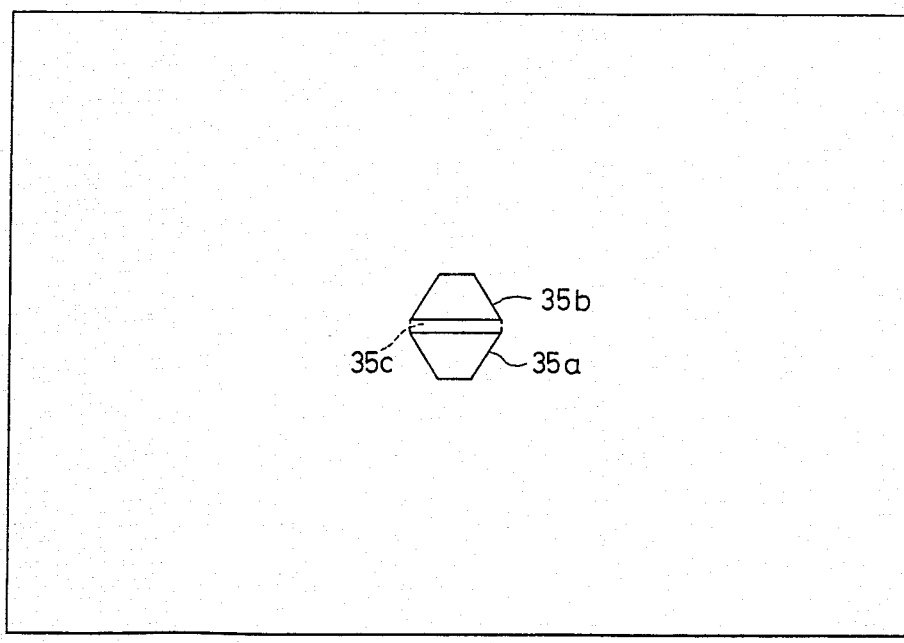
FIG. 14 shows the photometering area in the finder view field.

The AE system will now be described. The sensors SAE and SAF for AE, as described in connection with FIG. 7, are disposed adjacent to the line sensors SAA and SAB, and the image of the opening of the field mask 20 (the object image passed through the opening configuration) is projected thereon by light beams passed through the openings 22a and 22b of the stop 22, i.e., light beams passed through the areas 31a and 31b on the exit pupil shown in FIG. 6. Accordingly, the photometering area comprising a combination of the sensors SAE and SAF for AE assumes a spot-like shape as shown in FIG. 14, more strictly, the image of the opening of the field mask 20 from which a rectangular area 35c corresponding to the line sensors SAA and SAB is eliminated in the finder view field 34 (the areas indicated by 35a and 35b in FIG. 14). The area of the rectangular area 35c is considerably small and therefore, as the photometric sensitivity distribution, it can be regarded as the opening configuration of the field mask 20. By arranging the sensor driving circuits 32a and 32b for the line sensors SAA and SAB and the sensors SAE and SAF for AE alternately on one side in this manner, the combined sensitivity distribution (the photometering area) thereof can be made into the central portion of the picture plane (the center of the photographing field) surrounding the distance measuring area. Consequently, during spot photometric photography, exposure time control is effected on the basis of the value photometered by this photometering area, that is, control of the shutter 15 and the stop, not shown, is effected by a microcomputer, to be described.

Figure 15:
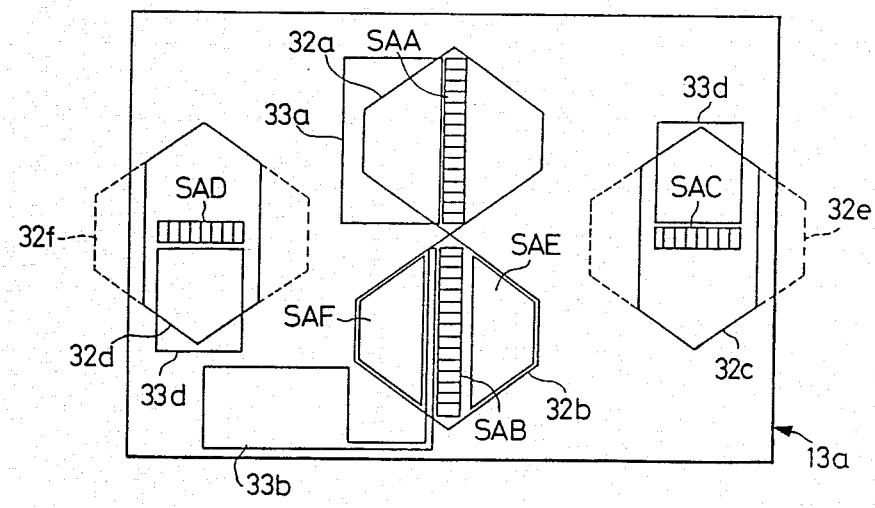
FIG. 15 shows another example of the arrangement relation between the line sensors for AF and the sensors for AE.
Figure 16:
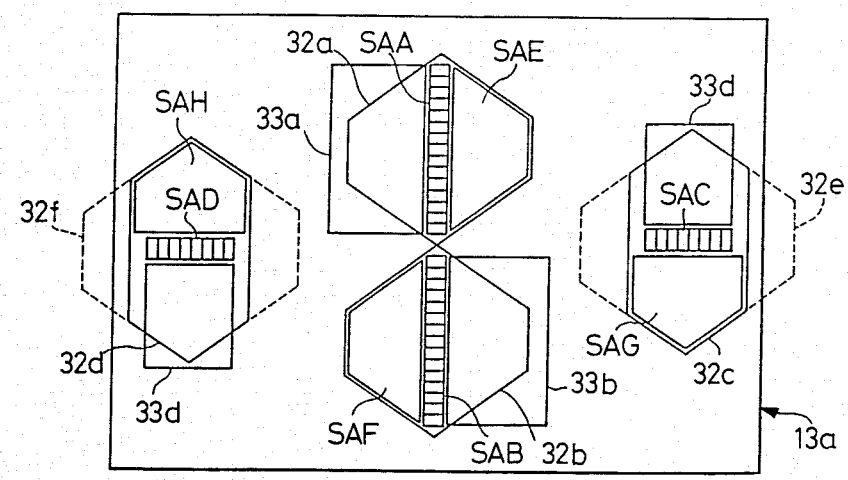
FIG. 16 shows still another example of the arrangement relation between the line sensors for AF and the sensors for AE.
Figure 17:
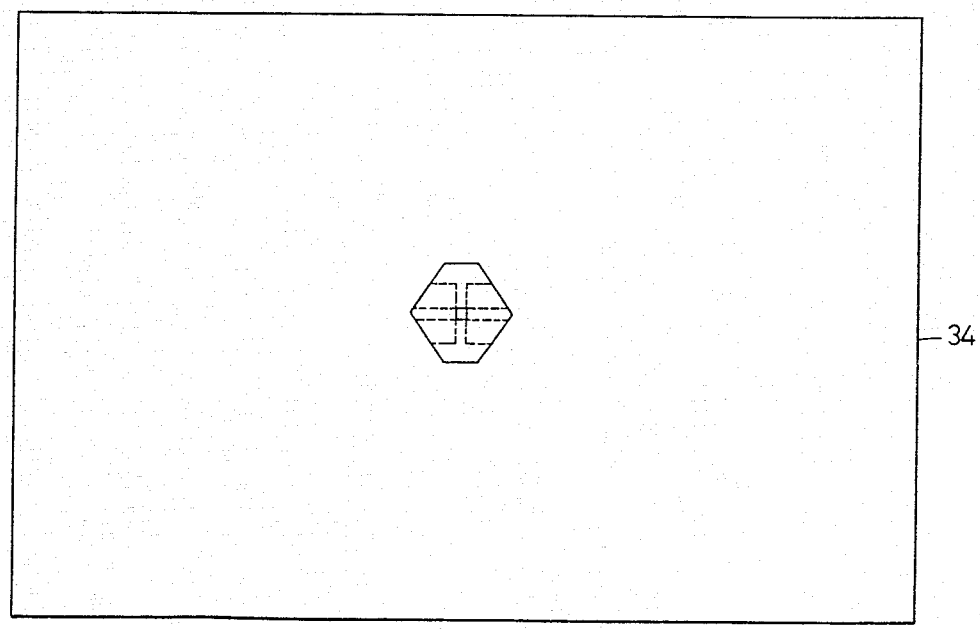
FIG. 17 shows the photometering area in the finder view field in the example shown in FIG. 16.

FIG. 15 shows another embodiment in which the relations between the photometering areas by the line sensors SAA and SAB shown in FIG. 7 and the photometering areas by the sensors SAE and SAF for AE are identical. FIG. 16 shows still another embodiment in which sensors SAG and SAH for AE are newly added alternately on one side to the sensor driving circuits 32c and 32d for the line sensors SAC and SAD. The combined photometering area of the sensors SAE, SAF and SAG, SAH for AE assumes a substantially spot-like shape as shown in FIG. 17. Again in these embodiments, the combined sensitivity distribution (the photometering area) thereof can be made into the central portion of the picture plane (the center of the photographing field) surrounding the distance measuring area.

Now, in the present embodiment, the flashlight control system, the AF system and the AE system share their optical path, but it is necessary that the wavelength range of the light entering the respective sensors be limited for each of those systems. That is, as regards the flashlight control system and the AE system, it is desirable that the spectral sensitivity characteristic thereof be made coincident with the spectral sensitivity characteristic of the film, while as regards the AF system, it must have sensitivity to near-infrared light because, for example, near-infrared auxiliary light is used for a low brightness object to be photographed. For the reason that as much light as possible should be introduced (to enhance the distance measurement accuracy) even in a case where near-infrared auxiliary light is not used, it is desirable to have sensitivity to near-infrared light. Generally, a sensor has sensitivity even to lights of wavelengths exceeding 1000 nm and therefore, infrared light need be cut by an optical filter.

Figure 18:
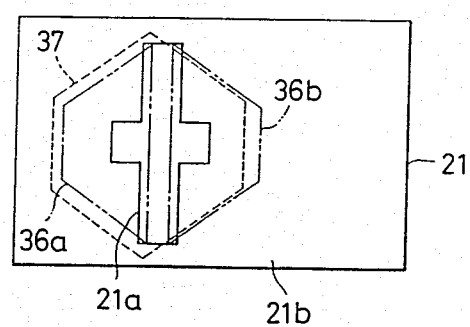
FIG. 18 is a top plan view showing the various areas of the infrared cut filter shown in FIG. 2.
Figure 19:
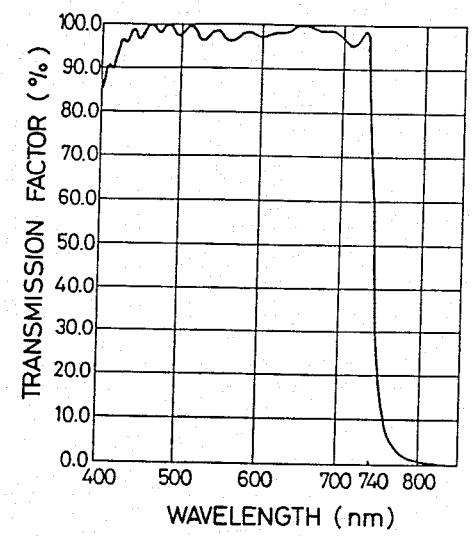
FIGS. 19 and 20 show the spectral transmittance characteristics in the respective areas of the infrared cut filter.
Figure 20:
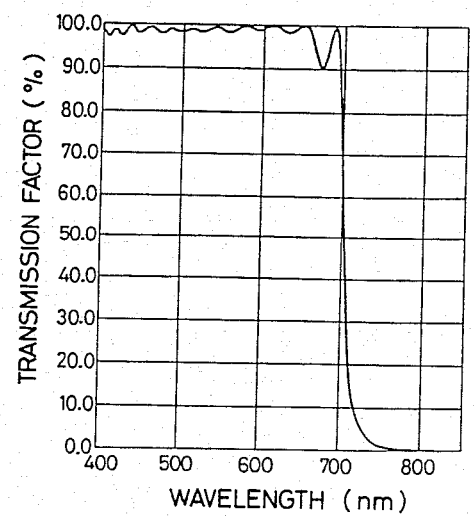

FIG. 18 shows an infrared cut filter 21 capable of achieving the above-mentioned requirement. In this figure, reference characters 36a and 36b designate effective portions in the AE system, and reference numeral 37 denotes an effective portion in the flashlight control system. This infrared cut filter 21 comprises two areas 21a and 21b of different spectral transmission factor characteristics, and the area 21a has a characteristic as shown, for example, in FIG. 19, and the area 21b has a characteristic as shown in FIG. 20. That is, the infrared ray cut wavelength of the area 21a is 740 nm, and the infrared ray cut wavelength of the area 21b is 700 nm. As shown in FIG. 18, the effective portions of the flashlight control system and the AE system lie astride two areas, but in any of them, the rate occupied by the area 21a is small relative to the area 21b and therefore, it is possible to effect photometry with a characteristic approximate to the spectral sensitivity characteristic (400–700 nm) of the film. In contrast, the effective portion of the AF system is designed so as to be completely included in the area 21a as can be seen from the shape of the area 21a, and consideration is given so that there is no irregularity of illumination on the surfaces of the line sensors.

Figure 21:
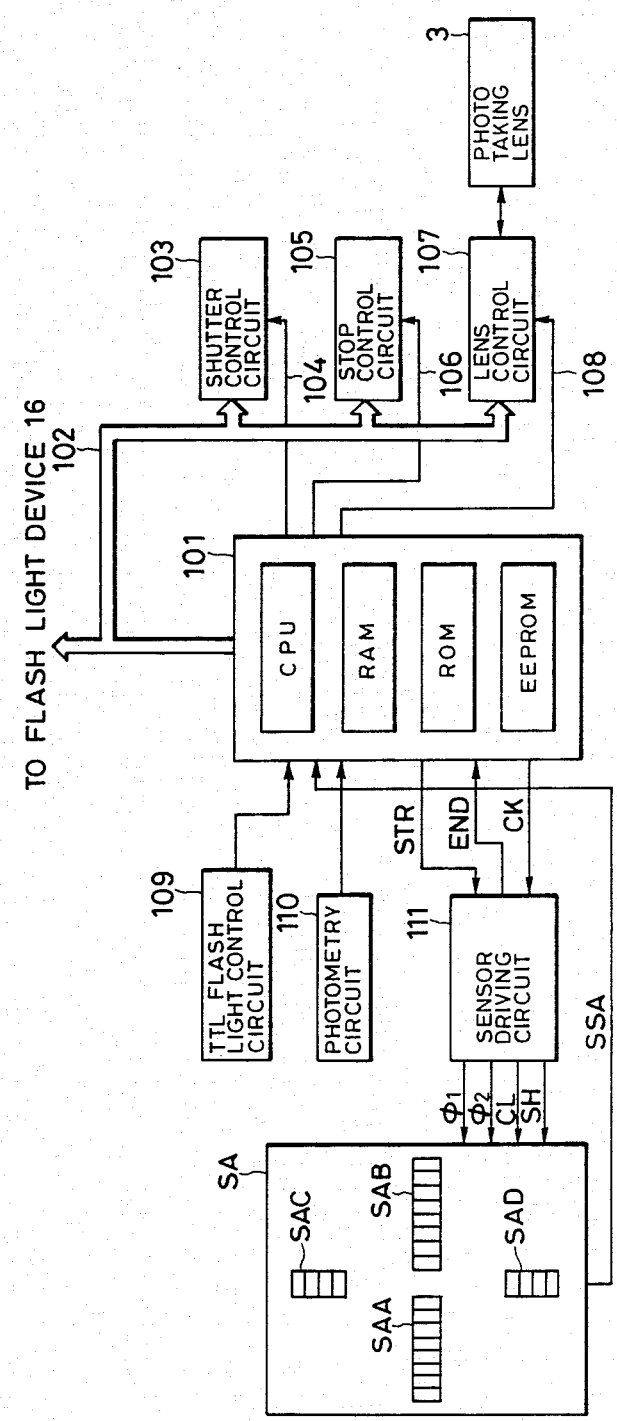
FIG. 21 is a block diagram schematically showing an embodiment of the present invention.

FIG. 21 is a block diagram schematically showing the essential portions of a single lens reflex camera having the above-described construction. Reference numeral 101 designates a control circuit for controlling various operations of the camera. It is, for example, a one-chip microcomputer containing therein a CPU (central processing unit), a RAM, a ROM, an EEPROM and input and output ports. A series of controlling software and parameter, including AF and photometric control, are stored in the ROM and EEPROM. Reference numeral 102 denotes a data bus, reference numeral 103 designates a shutter control circuit for receiving data input through the data bus 102 while a control signal 104 is input from the control circuit 101 and controlling the movement of the forward and rearward curtains of the shutter 15 on the basis of said data, reference numeral 105 denotes a stop control circuit for receiving data input through the data bus 102 while a control signal 106 is input and controlling a stop mechanism, not shown, on the basis of said data, and reference numeral 107 designates a lens control circuit for receiving data input through the data bus 102 while a control signal 108 is input and controlling the position of the phototaking lens 3 in the direction of the optic axis 4 on the basis of said data. Reference numeral 109 denotes a TTL flashlight control circuit comprising the aforedescribed flashlight control sensor 14, etc., and reference numeral 110 designates a photometry circuit for AE comprising the aforedescribed sensors SAE and SAF for AE, etc. The photometering signal photoelectrically converted by these is supplied, to the control circuit 101, in which it is used as the data for controlling the shutter control circuit 103, the stop control circuit 105 and the flashlight device 16.

Reference numeral 111 designates a sensor driving circuit for controlling the two sets of line sensors SAA, SAB and SAC, SAD each comprising a CCD, in accordance with each signal input from the control circuit 101.

A series of photographing operations will now be described briefly. When a first stroke of a release button, not shown, is effected, the light beam passed through the photo-taking lens 3, the main mirror 5, the sub-mirror 6, the field lens 11, the secondary imaging lens 12, etc. enters the sensors SAE and SAF for AE, and a photometric signal photoelectrically converted, i.e., the object brightness information, is supplied from the photometry circuit 110 to the control circuit 101.

Substantially simultaneously therewith, the control circuit 101 drives through the sensor driving circuit 111 the line sensor SA on which the object image is incident through a similar optical path, in order to obtain the phase difference $X_1$ between the image A and the image B and the phase difference $X_2$ between the image C and the image D (here is supposed a case where F4 or more is selected as the aperture). The operations of the control circuit 101, the sensor driving circuit 111 and the line sensor SA will now be described. When an accumulation starting signal STR is produced in the control circuit 101, the sensor driving circuit 111 outputs a clear signal CL to the line sensor SA, thereby clearing the charges in the photoelectric converting portions of the line sensors SAA, SAB and SAC, SAD. Thereupon, the line sensor SA starts the photoelectric conversion of the image being projected by the secondary imaging lens 12 disposed in the preceding stage and also starts the charge accumulating operation. When a predetermined time elapses after said operation is started, the sensor driving circuit 111 outputs a transfer signal SH to the line sensor SA, thereby transferring the charges accumulated in the photoelectric converting portion to the CCD portion. At the same time, the sensor driving circuit 111 outputs an accumulation end signal END to the control circuit 101, and waits for a CCD driving clock CK being input from the control circuit 101. When the CCD driving clock CK is input, the sensor driving circuit 111 produces CCD driving signals $\phi_1$ and $\phi_2$, and outputs these signals to the line sensor SA. When the CCD driving signals $\phi_1$ and $\phi_2$ are input to the line sensor SA, the line sensor SA outputs an analog image signal SSA to the control circuit 101 in accordance with these signals. Thus, the control circuit 101 A/D-converts the analog image signal in synchronism with the CCD driving clock CK, obtains image signals A(i)-D(i), calculates the phase differences $X_1$ and $X_2$, i.e., the focus detection signal, by a conventional operation system, and outputs this data to the lens control circuit 107. The lens control circuit 107 receives the data and controls the photo-taking lens 3 by a conventional driving system.

When a second stroke of the release button is then effected, the main mirror 5 and the sub-mirror 6 are moved up and the forward curtain of the shutter 15 is moved while, at the same time, the flashlight device 16 starts to emit a light. Thus, the flashlight is reflected by the surface of the object to be photographed, and this reflected light passes through the phototaking lens 3 to the film, whereupon the photographing of the object image onto the film is started. Also, part of the light beam having thus entered the film is reflected by the surface of the film, and passes through the field lens 11 to the flashlight control sensor 14, and the photometric signal received and photoelectrically converted thereby is output from the TTL flashlight control circuit 109 to the control circuit 101. Thereupon, the control circuit 101 detects that exposure has reached proper exposure, whereupon it outputs a light, emission stopping signal to the flashlight device 16, and then moves the rearward curtain of the shutter 15 using the shutter control circuit 103. Thereafter, the film is wound up and thus, a series of photographing operations are terminated.

According to the present embodiment, on both sides of the distance measuring area provided by the line sensors SAA and SAB (or SAA–SAD), the sensors SAE and SAF (or SAE–SAH) for AE are disposed in proximity to each other and so that their areas are substantially equal to each other, and spot photometry is effected by a combination of the outputs of these, whereby there are provided the following effects:

(1) Since the optical path is used in common with the AF system, spot photometry is possible without dividing the optical path by a half-mirror or the like and consequently, the construction becomes very simple and the layout in the camera is easy and moreover this is advantageous in terms of the quantity of light. Further, AF and AE can be effected substantially at the same time and therefore, the photographing time can be shortened.

(2) An optical system for spot photometry (except the sensors for AE) is not specifically necessary, but is used in common with the AF system and thus is advantageous in terms of cost.

(3) The line sensors SAA–SAD for AE and the line sensors SAE and SAF for AE can be formed on a single substrate, and this is also advantageous in terms of cost.

(4) The boundary between the spot photometering areas is clear.

(5) Only one lens is exposed in the mirror box and therefore, the reflection by the inner surface can be minimized.

(6) The AF system and the AE system can be made into a unit.

Getting into connected form the above-described effects provided by the present embodiment, the opening area of the field mask is set so that the secondary image of the object to be photographed is directed to both sides of the line sensor, and the sensors for spot photometry are disposed on both sides of said line sensor and in the area to which said secondary image is applied so that the photometric center of gravity is positioned substantially on said line sensor, whereby the center of the photographing field is made coincident with the center of the photometering area and distance measuring area while the sensors for spot photometry and the line sensors for focus detection are provided discretely from each other and therefore, the focus detecting function and the spot photometering function can be extracted to a maximum without making the construction complicated.

Also, according to the above-described embodiment, design is made such that the reflected light from the film is directed to the flashlight control sensor 14 through the field lens 11 for AF disposed in the lower portion of the mirror box, and this leads to the following effects:

(7) Both the AF system and the flashlight control system can be rationally disposed on the center (the optic axis 4) of the photo-taking optic axis of the camera.

(8) Since the necessary field lens is jointly used to improve the photometric sensitivity distribution, the camera can be made compact and low in cost.

(9) Since only one opening portion of the bottom surface of the mirror box (in the illustrated embodiment, that portion which is opposed to the field mask 20) is required, the rigidity of the camera is improved.

(10) Since only one lens is exposed in the mirror box, the reflection by the inner surface can be minimized.

(11) The AF system and the flashlight control system can be made into a unit.

In the above-described embodiment, description has been made with respect to a case where the TTL flashlight control sensor 14 is disposed, but the present invention is also applicable to a TTL photometry type camera in which the reflected light on the surface of the shutter 15 is photometered and control of the shutter 15 and a stop, not shown, is effected.

Getting the effects of the above-described embodiment into connected form, the sensor for TTL photometry is disposed at a position capable of introducing the reflected light from the object image forming plane through the field lens, whereby the field lens is used in common for the focus detecting optical system and the TTL photometering optical system and thereby, the center of these optical paths is positioned on the center of the optic axis and therefore, low cost and compactness of the camera can be achieved, and yet the performances of the focus detecting optical system and the TTL photometering optical system can be extracted to a maximum.

Also, according to the above-described embodiment, the surface of the infrared cut filter 21 is divided into two areas 21a and 21b of different spectral transmittance characteristics, and the effective portion of the AF system is provided by the area 21a and the effective portions of the AE system and the flashlight control system are provided by the area 21a and the area 21b, respectively, and this leads to the following effects:

(1) By only disposing an infrared cut filter 21 in the portion wherein the respective optical paths are shared, the respective systems can be endowed with their appropriate spectral sensitivity characteristics, and this leads to the possibility of realizing compactness and low cost of the camera.

(2) The photometric sensitivity characteristic of spot photometry can be positioned at the center of the picture plane.

(3) The area of the opening for TTL flashlight control can be made large.

(4) Since only one lens is exposed in the mirror box, the reflection by the inner surface can be minimized.

Getting the effects of the above-described embodiment into connected form, the spectral sensitivity correcting filter is disposed in the optical path shared by the focus detecting optical system and the photometering optical system, and is divided into a first area including the transmitted part of the light beam entering the sensor for focus detection and a second area including that portion of the transmitted part of the light beam entering the sensor for photometry which is not included in said first area, and the spectral transmission factor of said first area is determined to one suited for the sensor for focus detection and the spectral transmission factor of said second area is determined to one suited for the sensor for photometry, whereby different spectral transmittance characteristics are provided to the sensor for focus detection and the sensor for photometry by a spectral sensitivity correcting filter and therefore, compactness and low cost of the camera can be achieved, and yet the spectral sensitivity distributions on the sensors of the respective systems can be made proper.

What is claimed is:

1. A camera provided with a focus detecting apparatus in which an object light passed through a photo-taking lens is limited in its passage area by a field mask, the secondary image of an object to be photographed is obtained by a secondary imaging optical system and said secondary image is received by a line sensor, and the imaging condition of a photo-taking lens is detected on the basis of the photoelectrically converted output of said line sensor, comprising:

the opening area of said field mask being set so that the secondary image of the object to be photographed is directed to the both sides of said line sensor; and spot photometering sensors disposed on the both sides of said line sensor and in a area to which said secondary image is applied, so that the photometering center of gravity is positioned substantially on said line sensor.

2. A camera according to claim 1, wherein said secondary imaging optical system makes the object light passed through said field mask into two lines of light beams by at least a pair of stop openings and a secondary imaging lens, and both of said light beams are directed onto said line sensor.

3. A camera according to claim 2, wherein said line sensor and said spot photometering sensors are formed on the same substrate, whereby an area onto which at least a pair of said secondary images are projected is formed on said substrate.

4. A camera according to claim 3, wherein a pair of spot photometering sensor portions are disposed in about one-half area each of said pair of secondary images, and said spot photometering sensor portions in their combined state are set so that photometering of the whole region of the object light passed through said field mask can be accomplished.

5. A camera according to claim 4, further comprising a drive circuit for said line sensor actually provided in that part of the area of said pair of, secondary images in which said spot photometering sensor portions are not formed.

6. A camera according to claim 3, wherein the opening area of said field mask is made substantially circular, whereby said spot photometering sensor photometers said substantially circular area except the area of said line sensor.

7. A single lens reflex camera in which a focus detecting optical system having a secondary imaging optical system, a field lens disposed to place a pupil plane of said secondary imaging optical system in a substantially conjugate relation with the pupil plane of a photo-taking lens, and a focus detecting sensor for receiving the secondary image of an object to be photographed obtained by said secondary imaging optical system is provided below a reflecting mirror, comprising:
  (a) a TTL photometering sensor for photometering the reflected light from the object image forming plane;
    (a-1) said photometering sensor being disposed near said focus detecting optical system and below said reflecting mirror; and
    (a-2) said photometering sensor being disposed at a position whereat said reflected light from the object image forming plane can be introduced through said field lens of said focus detecting optical system.

8. A camera according to claim 7, wherein said focus detecting optical system is made into a unit by a holding member, and a holding portion of said TTL photometering sensor is provided on said holding member, whereby said focus detecting optical system and said TTL photometering sensor are made into a unit by said holding member.

9. A camera according to claim 7, wherein said object image forming plane is set on a film plane.

10. A camera according to claim 7, wherein said object image forming plane is set on a shutter plane.

11. A camera according to claim 9, further comprising a flashlight device secured to said single lens reflex camera and wherein said TTL photometering sensor receives the reflected light of an applied object light from the film plane when said flashlight device emits a light.

12. A camera according to claim 7, further comprising a light-intercepting member formed near said TTL photometering sensor so that an object light passed through said photo-taking lens does not directly enter said TTL photometering sensor.

13. A single lens reflex camera in which a focus detecting optical system having a field mask for limiting passage area of the object light passed through a photo-taking lens, a secondary imaging optical system, a field lens disposed to place a pupil plane of said secondary imaging optical system in a substantially conjugate relation with a pupil plane of said photo-taking lens, and a focus detecting line sensor for receiving a secondary image of an object to be photographed obtained by said secondary imaging optical system is provided below a reflecting mirror, comprising:
  (a) an opening area of said field mask being set so that the secondary image of the object to be photographed is directed to an area larger than the area of said focus detecting line sensor; and
  (b) a TTL photometering sensor for photometering a reflected light from an object image forming plane;
    (b-1) said photometering sensor being disposed near said focus detecting optical system and below said reflecting mirror; and
    (b-2) said photometering sensor being disposed at a position whereat said reflected light from the object image forming plane can be introduced through said field lens of said focus detecting optical system.

14. A camera according to claim 13, wherein said focus detecting optical system is made into a unit by a holding member, and a holding portion of said TTL photometering sensor is provided on said holding member, whereby said focus detecting optical system and said TTL photometering sensor are made into a unit by said holding member.

15. A photometering and distance measuring device in a camera comprising:
  (a) a focus detecting optical system having a focus detecting sensor;
  (b) a photometering optical system having a photometering sensor, said photometering optical system sharing at least a part of an optical path of said focus detecting optical system; and
  (c) a spectral sensitivity correcting filter for correcting the spectral sensitivity characteristics of said focus detecting sensor and said photometering sensor;
    (c-1) said filter being disposed in the shared optical path of said two optical systems;
    (c-2) said filter having a first area including a transmitted portion of a light beam entering said focus detecting sensor, and a second area as a portion of the transmitted portion of a light beam entering said metering sensor which is not included in said first area;
    a spectral transmission factor of said first area being set to one suited for said focus detecting sensor;
    a spectral transmission factor of said second area being set to one suited for said metering sensor.

16. A device according to claim 15, wherein said spectral sensitivity correcting filter effects infrared ray cutting, and relative to an infrared ray cut wavelength in said first area, an infrared ray cut wavelength in said second area is set to a lower wavelength.

* * * * *

UNITED STATES PATENT AND TRADEMARK OFFICE
CERTIFICATE OF CORRECTION

PATENT NO. : 4,774,539

DATED : September 27, 1988

INVENTOR(S) : YASUO SUDA, ET AL.

It is certified that error appears in the above-identified patent and that said Letters Patent is hereby corrected as shown below:

COLUMN 4

Line 2, "an" should read --the--.
    Line 3, "the" should read --an--.

COLUMN 6

Line 44, "imaqe" should read --image--.
    Line 47, "th" should read --the--.

COLUMN 8

Line 60, "parameter," should read --parameters,--.

COLUMN 9

Line 14, "supplied," should read --supplied--.

COLUMN 10

Line 22, "light," should read --light--.
    Line 48, "AE" should read --AF--.

COLUMN 12

Line 25, "the" should read --a--.
    Line 29, "a" should read --the--.
    Line 30, "the" (second occurrence) should read --a--.
    Line 32, "the" should read --an--.
    Line 34, "the" should be deleted.
    Line 36, "the" should be deleted.
    Line 37, "a" should read --the--.
    Line 38, "the" should read --a--.

UNITED STATES PATENT AND TRADEMARK OFFICE
CERTIFICATE OF CORRECTION

PATENT NO. : 4,774,539
DATED : September 27, 1988
INVENTOR(S) : YASUO SUDA, ET AL.

Page 2 of 2

It is certified that error appears in the above-identified patent and that said Letters Patent is hereby corrected as shown below:

COLUMN 12

Line 61, "of," should read --of--.

COLUMN 13

Line 5, "the" should read --a--.
Line 6, "the" should read --a--.
Line 11, "the" (first occurrence) should read --a-- and "the" (second occurrence) should read --an--.
Line 45, "passage area of the object" should read --the passage area of an object--.

COLUMN 14

Line 40, "metering" should read --photometering--.
Line 46, "metering" should read --photometering--.

Signed and Sealed this

Twentieth Day of March, 1990

Attest:

JEFFREY M. SAMUELS

*Attesting Officer*   *Acting Commissioner of Patents and Trademarks*